United States Patent [19]
Scheim et al.

[11] Patent Number: 6,018,011
[45] Date of Patent: *Jan. 25, 2000

[54] POLYORGANOSILOXANES WITH DIALKOXYORGANOSILOXY END GROUPS

[75] Inventors: Uwe Scheim, Coswig; Peter Jenkner, Rheinfelden; Robert Lehnert, Dresden, all of Germany

[73] Assignee: Huels Silicone GmbH, Nuenchritz, Germany

[*] Notice: This patent is subject to a terminal disclaimer.

[21] Appl. No.: 09/098,644

[22] Filed: Jun. 17, 1998

[30] Foreign Application Priority Data

Jun. 17, 1997 [DE] Germany .......................... 197 25 518

[51] Int. Cl.$^7$ ..................................... C08G 77/26
[52] U.S. Cl. ................................. 528/34; 528/26; 528/28; 556/407; 548/406
[58] Field of Search .................................. 528/34, 26, 28; 556/407; 548/406

[56] References Cited

U.S. PATENT DOCUMENTS

| | | | |
|---|---|---|---|
| 5,223,170 | 6/1993 | Ohashi et al. | 252/174.15 |
| 5,409,963 | 4/1995 | Takeoka | 522/31 |
| 5,741,839 | 4/1998 | Scheim | 524/188 |

*Primary Examiner*—Margaret G. Moore
*Attorney, Agent, or Firm*—Oblon, Spivak, McClelland, Maier & Neustadt, P.C.

[57] ABSTRACT

The present invention relates to a polyorganosiloxane having at least one dialkoxyorganosiloxy group, where the organo radical is a substituted amidoalkyl radical.

15 Claims, No Drawings

POLYORGANOSILOXANES WITH DIALKOXYORGANOSILOXY END GROUPS

BACKGROUND OF THE INVENTION

1. Field of the Invention

The present invention relates to a polyorganosiloxane having at least one dialkoxyorganosiloxy group, the organo radical being a substituted amidoalkyl radical. The novel polydiorganosiloxane is preferably used in an RTV1 silicone rubber mixture.

2. Discussion of the Background

There are known single-component silicone rubber mixtures (RTV1) which can be stored in the absence of water and subsequently vulcanized in the presence of water at room temperature to give elastomers. They generally comprise a polymer, usually a linear siloxane crosslinker which must contain readily hydrolyzable groups, a plasticizer, which is usually a methyl-terminated polydimethylsiloxane, and other additives as desired, such as curing accelerators, pigments, processing aids and fillers. The vulcanization of the mixtures may take place under acid conditions, e.g. in the presence of acetoxysilanes, basic conditions, e.g. using aminosilanes, or neutral conditions, e.g. by means of compounds which have oximo or alkoxy groups. RTV1 systems which crosslink under neutral conditions are needed especially if the substrate is not to be affected by the elimination products produced during the curing of the mixtures, for example in the jointing of concrete or of metallic materials. The terms "RTV" and "RTV1" are used in accordance with common practice in the art, to denote "Room Temperature Vulcanizing" and "Single Component RTV", respectfully.

A polymer having OH groups is normally used for formulating RTV1 materials. This procedure is used, for example, with acetate-, oxime- and amine-crosslinking mixtures. However, this method is not successful in the case of alkoxy-crosslinking materials, since these materials become cured as early as during mixing if OH-end-group polymers are used. To avoid this, polymers with alkoxy end groups are used for alkoxy-crosslinking RTV1 systems. Their preparation is known and generally takes place by reacting a hydroxyl-terminated polydiorganosiloxane of a certain viscosity with an alkoxysilane in the presence of a catalyst. The condensation (elimination of alcohol) which takes place in the above system, forms the desired polymer. An α,ω-dihydroxypolydimethylsiloxane is usually used for this reaction, because of the ready availability in industrial quantities and the high reactivity of such a material (inter alia EP 137 883, EP 304 701 and EP 559 045). The alkoxysilane used is usually methyltrimethoxysilane. There are also known processes in which use is made of compounds such as amino-propyltrimethoxysilane, aminoethylaminopropyltrimethoxysilane, glycidoxypropyltrimethoxysilane and methacryloxypropyl-trimethoxysilane. These compounds, react with the hydroxyl-terminated polydimethylsiloxane even in the absence of a catalyst (DE 44 05 851).

In the processes described, it is important that there is complete reaction of the OH end groups with the alkoxysilane. If OH groups remain in the polymer, then premature crosslinking still occurs when the RTV1 mixture is prepared, and this is precisely what should be avoided by reacting the OH end-group polymer with the alkoxysilane. However, in the process described, only the use of methoxysilanes gives polymers which have no residual OH groups. Because methanol is toxic, however, it was desirable to prepare polymers with other than methoxy end groups, for example polymers carrying ethoxy end groups.

In the hitherto known reactions of hydroxyl-terminated polyorganosiloxanes with ethoxysilanes, the reaction between the OH groups and the ethoxysilanes proceeds either only incompletely or very slowly. Polymers which carry diethoxyhydridosiloxy end groups are an exception. These may be prepared, for example, by reacting hydroxyl-terminated polymers with triethoxysilane (DE 41 13 554). The disadvantage of this process is that the triethoxysilane can be handled only with difficulty, and on storage can decompose into compounds which spontaneously ignite. There is also the possibility that hydrogen may evolve on storage of the polymers or of the finished RTV1 mixtures prepared therefrom.

Another way of obtaining polysiloxanes with ethoxy end groups is by hydrosilylation. For example, according to U.S. Pat. No. 4,772,675, 1-(2-triethoxysilylethyl)-1,1,3,3-tetramethyldisiloxane, which is obtainable from vinyltriethoxysilane and 1,1,3,3-tetramethyldisiloxane, can be reacted with a vinyl-terminated polydimethylsiloxane. U.S. Pat. No. 4,962,174 describes the reaction of an H-terminated polydimethylsiloxane with vinyltriethoxysilane. It is, moreover, possible to react, firstly, a hydroxyl-terminated polydimethylsiloxane with 1,1,3,3-tetramethyldisiloxane in the presence of a platinum compound with elimination of hydrogen, to give an H-terminated polymer, which then likewise reacts with vinyltriethoxysilane. However, these processes always need, as starting material, a compound with a dimethylhydrido group, which, however, are difficult to obtain or have complicated methods of preparation.

SUMMARY OF THE INVENTION

It is an object of the present invention to provide a polyorganosiloxane, having pendant at least one dialkoxyorganosiloxy group, which can be used as polymers in alkoxy-crosslinking RTV1 silicone rubber mixtures, where various crosslinking systems can be used, in addition to ethoxy-crosslinking systems, because of the variability of the bonded alkoxy groups.

Further, the present invention provides a polyorganosiloxane having at least one dialkoxyorganosiloxy group, where the organo radical is a substituted amidoalkyl radical.

DESCRIPTION OF THE PREFERRED EMBODIMENTS

The novel polyorganosiloxane contains at least one dialkylorganosiloxy group of the general formula (I)

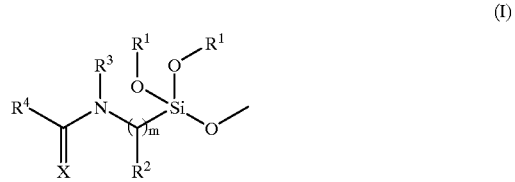

where $R^1$, independently of each other, are unsubstituted and/or substituted alkyl and/or silyl radicals, $R^2$, independently of each other, are unsubstituted and/or substituted, saturated and/or unsaturated alkyl and/or aryl radicals and/or hydrogen, $R^3$ is unsubstituted or substituted, saturated or unsaturated alkyl, aryl or acyl radical or hydrogen, $R^4$ is unsubstituted or substituted, saturated or unsaturated alkyl or aryl radical or hydrogen and X is oxygen or sulfur, where the radicals $R^3$ and $R^4$ may form an alicyclic or heterocyclic ring, and m is either 1 or 2.

Preferred dialkoxyorganosiloxy groups of the general formula (I) are 1-(2-pyrrolidinon-1-yl)alkyldialkoxysiloxy and/or 2-(2-pyrrolidinon-1-yl)alkoxydialkoxysiloxy radicals, and also 1-(N-methylacetamido) alkyldialkoxysiloxy and/or 2-(N-methylacetamido) alkyldialkoxysiloxy radicals.

The polyorganosiloxane with dialkoxyorganosiloxy groups corresponds, for example, to the general formula (II)

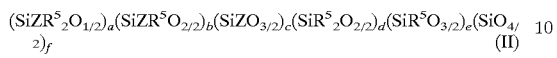
(II)

where $R^5$, independently of one another, are unsubstituted and/or substituted, saturated and/or unsaturated alkyl and/or aryl radicals, and Z is either $R^5$ or a dialkoxyorganosiloxy group of the general formula (I), with the proviso that at least one dialkoxyorganosiloxy group is bonded within each molecule, a has a value from 1 to 10, b and c, independently of one another, have a value from 0 to 100, d has a value from 20 to 2000, and e and f, independently of one another, have a value from 0 to 100. A polyorganosiloxane of the general formula (II) may, resulting from their preparation, still contain small amounts of hydroxyl groups bonded to silicon.

A preferred polyorganosiloxane having at least one dialkoxyorganosiloxy group is a compound of the general formula (III)

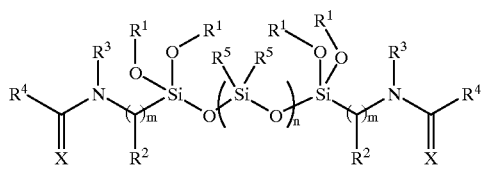
(III)

where $R^1$ to $R^5$, X and m, are as defined above and n has a value from 100 to 1600.

A polyorganosiloxane, in accordance with the present invention, having at least one dialkoxyorganosiloxy group of the general formula (I) in accordance with the present invention may be obtained by reacting a polyorganosiloxane, which has at least one hydroxyl group bonded to silicon, with an alkoxysilane of the general formula (IV)

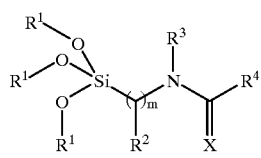
(IV)

where $R^1$ to $R^4$ and X, and m, are as defined above, and/or a partial hydrolysate thereof.

The polyorganosiloxane, in accordance with the present invention, having at least one hydroxyl group bonded to silicon is preferably a hydroxyl-terminated polydiorganosiloxane of the general formula (V)

$$HO(SiR^5{}_2O)_nH \quad (V)$$

where $R^5$ and n are as defined above.

Polyorganosiloxanes, in accordance with the present invention, having at least one hydroxyl group bonded to silicon, in particular one of the general formula (V), are known. They are usually prepared either by polymerizing a cyclic siloxane in the presence of a strongly basic catalyst and a small amount of water or by polycondensing a short-chain linear oligomer having an OH end group. Since the starting compounds used for the synthesis may contain, in addition to the bifunctional units which are primarily desired, tri- and tetrafunctional units, the polymers always also contain compounds which have one or more branches in the molecule. The larger the content of tri- or tetrafunctional units in the starting materials and the larger the molecular weight of the polymer, the greater is the probability that the molecules will contain branching points. Preferred substituents $R^5$ are methyl, ethyl, phenyl, vinyl and trifluoropropyl radicals. Because of their ready availability, particularly preferred are α,ω-dihydroxypolydimethylsiloxanes in which n in formula (V) has a value from 100 to 1600. Although the use of purely linear polymers is preferred, it is also possible to use polymers which contain branching points.

The alkoxysilanes, in accordance with the present invention, of the general formula (IV) are compounds which have no silyl group bonded as radical $R^1$, and/or partial hydrolysates of thereof. Preferred are N-1-(triethoxysilyl) ethyl-2-pyrrolidone, N-2-(triethoxysilyl)ethyl-2-pyrrolidone, N-1-(triethoxysilyl)ethyl-N-methylacetamide or N-2-(triethoxysilyl)ethyl-N-methylacetamide, or mixtures thereof. An example, in accordance with the present invention, of a partial hydrolysate of an alkoxysilane of the general formula (IV) is 1,3-bis(1'-N-methylacetamidoethyl) 1,1,3,3-tetraethoxydisiloxane.

The alkoxysilanes, in accordance with the present invention, of the general formula (IV) may moreover be the reaction product of an alkoxysilane of the general formula (IV) which contain no silyl group, and/or of partial hydrolysates thereof, with an organosilane partial hydrolysate thereof of the general formula (VI)

$$R^5{}_xSi(OR^1)_{4-x} \quad (VI)$$

where $R^1$ and $R^5$ are as defined above and x has a value from 0 to 3, for example 1-N-[(methyldiethoxysiloxy)-diethoxysilyl]ethyl-2-pyrrolidone.

Organotriethoxysilanes and/or tetraethoxysilanes which are also used as crosslinking agents in the RTV1 systems are preferred as an organosilane, in accordance with the present invention, of the general formula (VI).

Other examples of alkoxysilanes of the general formula (IV) are:

---

N-1-(triethoxysilyl)ethylsuccinimide

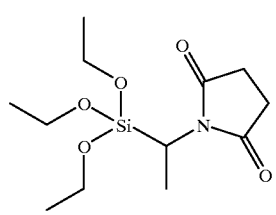

$R^1$ = $CH_2CH_3$, $R^2$ = $CH_3$, $R^3$—$R^4$ = —$CO(CH_2)_2$—, X = O, m = 1
N-2-(triethoxysilyl)ethylsuccinimide

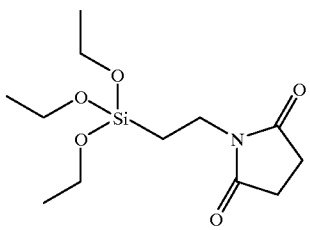

R¹ = CH₂CH₃, R² = H, R³—R⁴ = —CO(CH₂)₂—, X = O, m = 2
N-1-(triethoxysilyl)ethylphthalimide

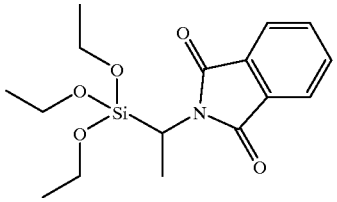

R¹ = CH₂CH₃, R² = CH₃, R³—R⁴ = —COC₆H₄—, X = O, m = 1
N-2-(triethoxysilyl)ethylphthalimide

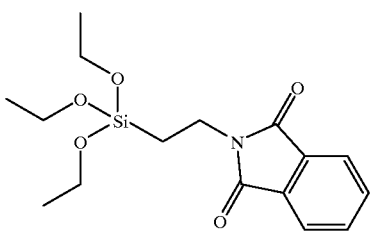

R¹ = CH₂CH₃, R² = H, R³—R⁴ = —COC₆H₄—, X = O, m = 2
N-1-(trimethoxysilyl)ethyl-2-pyrrolidone

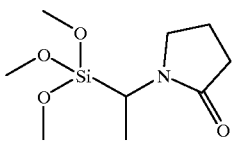

R¹ = R² = CH₃, R³—R⁴ = —(CH₂)₃—, X = O, m = 1
N-2-(trimethoxysilyl)ethyl-2-pyrrolidone

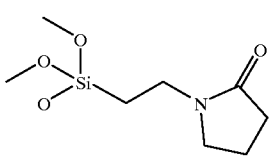

R¹ = CH₃, R² = H, R³—R⁴ = —(CH₂)₃—, X = O, m = 2
N-1-(tri-n-propoxysilylethyl-N-methylacetamide

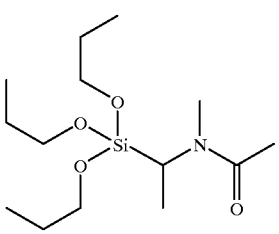

R¹ = CH₂CH₂CH₃, R² = R³ = R⁴ = CH₃, X = O, m = 1

N-2-(tri-n-propoxysilyl)ethyl-N-methylacetamide

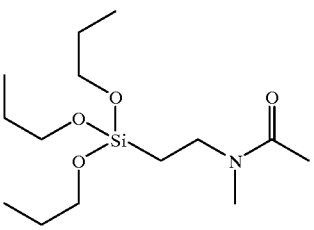

R¹ = CH₂CH₂CH₃, R² = H, R³ = R⁴ = CH₃, X = O, m = 2
N-1-(tris(2-methoxyethoxy)silyl)ethyl-N-methylthioacetamide

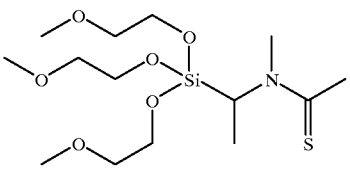

R¹ = CH₂CH₂OCH₃, R² = R³ = R⁴ = CH₃, X = S, m = 1
N-2-(tris(2-methoxyethoxy)silyl)ethyl-N-methylthioacetamide

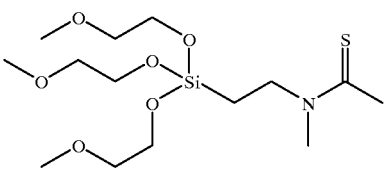

R¹ = CH₂CH₂OCH₃, R² = H, R³ = R⁴ = CH₃, X = S, m = 2

Mixtures of two or more of the above compounds are also preferred.

The above compounds are obtained, for example, by an addition reaction of the corresponding trialkoxysilane with the corresponding N-vinyl-substituted amide.

The amount of the alkoxysilane of the general formula (IV) to be used depends on the content of hydroxyl groups bonded to silicon in the polyorganosiloxane and may readily be matched to the particular need by a person skilled in the art. The alkoxysilane of the general formula (IV) is generally used in an amount of from 0.1 to 10% by weight, preferably from 1 to 5% by weight, based on the polyorganosiloxane used as reaction counterpart. The excess of alkoxysilane remaining at the end of the reaction can remain in the product or be removed and used for another reaction.

The reaction between an alkoxysilane and a polyorganosiloxane with hydroxyl groups bonded to silicon proceeds without addition of a catalyst, even at room temperature. The temperature, however, may be increased to accelerate the reaction. The preferred temperature range is from 20 to 130° C., temperatures of from 80 to 110° C. being particularly preferred. For further acceleration, it is possible to add a known compound which catalyzes the reaction between a hydroxyl-terminated polyorganosiloxane and an alkoxysilane. Examples of such compounds are NaOH or KOH, lithium compounds, such as LiOH, Li silanolates, alkali metal alcoholates, which have been mixed with $CO_2$ or carboxylic acids to lessen their reactivity, Lewis acids, e.g. aluminum chelates, combinations of acids and amines or ammonium carbamates.

The polyorganosiloxanes, in accordance with the present invention, with dialkoxyorganosiloxy groups may be used as polymers in RTV1 silicone rubber mixtures.

The RTV1 mixtures may comprise in addition a crosslinking agent, for example, an alkoxysilane or a partial hydrolysate thereof of the general formula (VII)

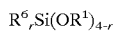

(VII)

where $R^1$ is as defined above and $R^6$ is a substituted or unsubstituted alkyl, alkenyl or aryl radical or a radical of the structure

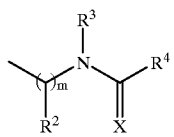

where $R^2$, $R^3$, $R^4$, X and m are as defined above. Preferred alkoxysilanes are methyltriethoxysilane, vinyltriethoxysilane, tetraethoxysilane, phenyltriethoxysilane, tetrakis(2-methoxyethoxy)silane, tetrakis(2-butoxyethoxy)silane, N-1-(triethoxysilyl)ethyl-2-pyrrolidone, N-1-(triethoxysilyl)ethyl-N-methylacetamide, N-2-(triethoxysilyl)ethyl-2-pyrrolidone and N-2-(triethoxysilyl)ethyl-N-methylacetamide. It is also possible to use, as crosslinking agent, any desired mixture of the alkoxysilanes mentioned above. The same effect is also achieved with an oligomeric hydrolysate/condensate of one or of a mixture of the compounds mentioned above.

Particularly preferred plasticizers in RTV1 systems are trimethylsilyl-terminated polydimethylsiloxanes with viscosities of from 0.1 to 1 Pa·s. It is also possible to use a methyl-terminated polydimethylsiloxane in which at least one of the methyl groups has been replaced by another organic group, such as phenyl, vinyl or trifluoropropyl. It is also possible to use a branched compound, which is produced when the silane used to synthesize the plasticizer also contains a tri- or tetrafunctional silane. It is furthermore also possible to use another organic compound, e.g. certain hydrocarbon mixtures, as plasticizers.

In order to achieve a sufficiently high rate of crosslinking, a crosslinking catalyst is added to the system. Preferred crosslinking catalysts include a dialkyltin compound, e.g. dibutyltin dilaurate or diacetate, and/or a titanium compound, such as tetrabutyl titanate or a titanium chelate. It is also possible to use mixtures of the above catalysts.

To achieve certain mechanical properties, it is also possible to add to the RTV1 system a filler with high specific surface area, such as fumed silica or precipitated calcium carbonate. It is also possible to use a filler with low specific surface area as an extender. Ground calcium carbonate is preferred for this purpose.

Known additives other than those described, for example color pigments, coupling agents and fungicides, may be admixed, depending on the application of the RTV1 systems.

The polyorganosiloxanes, in accordance with the present invention, having at least one dialkoxyorganosiloxy group may be used to prepare RTV1 silicone rubber mixtures which cure rapidly and tack-free. The mechanical properties of the products correspond to the values obtained for the methoxy-crosslinking systems existing hitherto. The particular advantage is that it is now possible to create systems whose crosslinking produces only elimination products which are completely free from toxic methanol.

Having generally described this invention, a further understanding can be obtained by reference to certain specific examples which are provided herein for purposes of illustration only and are not intended to be limiting unless otherwise specified. Further, the following Examples are described in the priority document DE P 197 25 518-3, filed Jun. 17, 1997, which is incorporated herein by reference, in its entirety.

EXAMPLES

Example 1

2000 g of an α,ω-dihydroxypolydimethylsiloxane having a viscosity of 50,000 mPa·s were mixed with 100 g of N-1-(triethoxysilyl)ethyl-2-pyrrolidone in which 1 g of zinc acetylacetonate had been dissolved. After a reaction time of 2 hours at 80° C., the reaction was terminated. The excess ethoxysilane was distilled off. There remained a polymer with a viscosity of 57,000 mPa·s and an OH content of <30 mg/kg.

Example 2

2000 g of an α,ω-dihydroxypolydimethylsiloxane having a viscosity of 50,000 mPa·s were mixed with 100 g of N-1-(triethoxysilyl)ethyl-2-pyrrolidone. After a reaction time of 2 hours at 130° C., the reaction was terminated. The excess ethoxysilane was distilled off. There remained a polymer having a viscosity of 53,500 mPa·s and an OH content of <30 mg/kg.

Example 3

2000 g of an α,ω-dihydroxypolydimethylsiloxane with a viscosity of 50,000 mPa·s were mixed with 100 g of N-1-(triethoxysilyl)ethyl-N-methylacetamide in which 1 g of zinc acetylacetonate had been dissolved. After a reaction time of 2 hours at 80° C., the reaction was terminated. The excess ethoxysilane was distilled off. There remained a polymer having a viscosity of 57,000 mPa·s and an OH content of <30 mg/kg.

Example 4

2 g of 1,7-dihydroxy-1,1,3,3,5,5,7,7-octamethyltetrasiloxane were mixed with 3.5 g of N-1-(triethoxysilyl)ethyl-N-methylacetamide, in which 20 mg of zinc acetate had been dissolved. The reaction was followed with the aid of $^{29}Si$ NMR spectroscopy. After a reaction time of 24 hours at room temperature, the OH groups had reacted quantitatively. The end groups formed were exclusively the desired 1-(N-methylacetamido)ethyldiethoxysiloxy groups. Ethoxydimethylsiloxy groups, which could have formed through reaction of the OH groups with ethanol, were not observed. Triethoxysiloxy end groups, which could have been produced by elimination of N-methylacetamide from the N-1-(triethoxysilyl)ethyl-N-methylacetamide used, were likewise not detectable.

Example 5

The experiment of Example 4 was repeated, using N-1-(triethoxysilyl)ethyl-2-pyrrolidone. In this reaction, too, the end groups formed were exclusively the desired diethoxy-organosiloxy groups.

Example 6

2 g of 1,7-dihydroxy-1,1,3,3,5,5,7,7-octamethyltetrasiloxane were mixed with 3.5 g of N-1-(tri-n-propoxysilyl)ethyl-N-methylacetamide. After a reaction time of 24 hours at room temperature, the OH groups had reacted quantitatively. It was established from the $^{29}Si$ NMR spectra that the end groups formed were exclusively the desired 1-(N-methylacetamido)ethyldi-n-propoxysiloxy groups, n-Propoxydimethoxysiloxy groups, which could have formed through reaction of the OH groups with n-propanol, were not observed. Tri-N-propoxysiloxy end groups, which could have been produced by elimination of N-methylacetamide from the N-1-(tri-n-propoxysilyl)ethyl-N-methylacetamide used, were likewise not detectable.

Example 7

A mixture of 11.8 g of methyltriethoxysilane and 14.9 g of N-1-(triethoxysilyl)ethyl-N-methylacetamide was mixed with 1.1 g of water in 10 ml of ethanol. After 24 hours, the ethanol formed was distilled off together with that which was added as solvent. There remained 20.5 g of an oligomeric hydrolysate, which was composed of 34% by weight of methyltriethoxysilane, 8% by weight of N-1-(triethoxysilyl)ethyl-N-methylacetamide, 27% by weight of N-1-[(diethoxymethylsiloxy)diethoxysilyl]ethyl-N-methylacetamide, 8% by weight of 1,3-bis(1'-(N-methylacetamido)ethyl-1,1,3,3-tetraethoxydisiloxane and 23% by weight of higher oligomeric hydrolysis/condensation products of N-1-(triethoxysilyl)ethyl-N-methylacetamide. Its make-up was determined by $^{29}$Si NMR spectroscopy.

20 g of this oligomeric mixture were mixed with 100 g of an α,ω-dihydroxypolydimethylsiloxane with a viscosity of 20,000 mPa·s. After a reaction time of 2 hours at 110° C., the reaction was terminated. There remained a polymer with a viscosity of 27,000 mPa·s and an OH content of <30 mg/kg.

Example 8

473 g of the polymer prepared as in Example 1,350 g of a methyl-terminated polydimethylsiloxane having a viscosity of 100 mPa·s, 103 g of a fumed silica made hydrophobic with hexamethyldisilazane and having a surface area of about 200 m$^2$/g, 41 g of methyltriethoxysilane and 12 g of bis(ethylacetoacetato) diisobutoxy titanate were processed with a dissolver to give a firm-consistency paste which crosslinks on exposure to atmospheric humidity to give a silicone rubber. The properties of this product are given in Table 1.

Example 9

473 g of the polymer prepared as in Example 1, but without removal of the excess of ethoxysilane, 350 g of a methyl-terminated polydimethylsiloxane having a viscosity of 100 mPa·s, 164 g of a fumed silica made hydrophobic with hexamethyldisilazane and having a surface area of about 200 m$^2$/g, 25 g of methyltriethoxysilane and 37 g of bis(ethylacetoacetato) diisobutoxy titanate were processed with a dissolver to give a firm-consistency paste which crosslinks on exposure to atmospheric humidity to give a silicone rubber. The properties of this product are given in Table 1.

Example 10

473 g of the polymer prepared as in Example 3, but without removal of the excess of ethoxysilane, 350 g of a methyl-terminated polydimethylsiloxane having a viscosity of 100 mPa·s, 103 g of a fumed silica made hydrophobic with hexa-methyldisilazane and having a surface area of about 200 m$^2$/g, 25 g of methyltriethoxysilane and 37 g of bis(ethylacetoacetato) diisobutoxy titanate were processed with a dissolver to give a firm-consistency paste which crosslinks on exposure to atmospheric humidity to give a silicone rubber. The properties of this product are given in Table 1.

Comparative Example 11

In order to be able to compare the properties of the materials obtained in the examples above, a mixture was prepared which comprised the raw materials known hitherto, but which is methoxy-crosslinking, i.e. a considerable amount of methanol is produced during its curing.

1150 g of a methoxy-terminated polymer, which had been prepared by reacting an α,ω-dihydroxypolydimethylsiloxane having a viscosity of 50,000 mPa·s and methyltrimethoxysilane in the presence of zinc acetylacetonate at 80° C., 850 g of a methyl-terminated polydimethylsiloxane having a viscosity of 100 mPa·s, 400 g of a fumed silica made hydrophobic with hexamethyldisilazane and having a surface area of about 200 m$^2$/g, 80 g of methyltrimethoxysilane and 30 g of bis (ethylacetoacetato) diisobutoxy titanate were processed in a dissolver to give a firm-consistency paste which on exposure to atmospheric humidity crosslinks to give a silicone rubber. The properties of this product are given in Table 1.

TABLE 1

| Property | Method | Ex. 8 | Ex. 9 | Ex. 10 | Comp. Ex. 11 |
| --- | --- | --- | --- | --- | --- |
| Skin formation time (min) | | 20 | 30 | 30 | 20 |
| Tensile strength (MPa) | DIN 53504 S2 | 1.28 | 1.26 | 0.87 | 1.45 |
| Elongation at break (%) | DIN 53504 S2 | 883 | 650 | 473 | 630 |
| Tension at 100% elongation (MPa) | DIN 53504 S2 | 0.25 | 0.41 | 0.29 | 0.32 |
| Shore A hardness | DIN 53505 | 13 | 23 | 13 | 17 |

The skin formation time was measured immediately after the product was prepared. The mechanical properties (tensile strength, elongation at break, tension at 100% elongation and hardness) were determined after curing for 7 days at 23° C. and 50% relative humidity.

Obviously, numerous modifications and variations of the present invention are possible in light of the above teachings. It is therefore to be understood that within the scope of the appended claims, the invention may be practiced otherwise than as specifically described herein.

We claim:

1. A polyorganosiloxane having at least one organosiloxy group of formula (I)

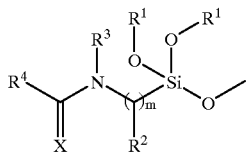

(I)

where $R^1$, independently of each other, are unsubstituted or substituted alkyl or a silyl radical; $R^2$, independently of each other, are unsubstituted, substituted, saturated or unsaturated alkyl or aryl radicals or hydrogen; $R^3$ is unsubstituted, substituted, saturated or unsaturated alkyl, aryl or acyl radical or hydrogen; $R^4$ is an alkyl or aryl radical or hydrogen; X is oxygen or sulfur; and m is either 1 or 2.

2. The polyorganosiloxane of claim 1, wherein the dialkoxyorganosiloxy group is selected from the group consisting of a 1-(N-methylacetamido)alkyldialkoxysiloxy and 2-(N-methylacetamido)alkyldialkoxysiloxy radical.

3. The polyorganosiloxane of claim 1, wherein said polyorganosiloxane corresponds to formula (II)

(II)

where $R^5$, independently of one another, are unsubstituted or substituted, saturated or unsaturated alkyl or aryl radicals, and Z is either $R^5$ or a organosiloxy group of formula (I), with the proviso that at least one organosiloxy group is bonded within each molecule, a has a value from 1 to 10, b and c, independently of one another, have values from 0 to 100, d has a value from 20 to 2000, and e and f, independently of one another, have values from 0 to 100.

4. The polyorganosiloxane of claim 1, wherein said polyorganosiloxane corresponds to formula (III)

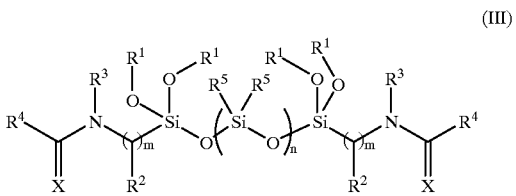

(III)

where $R^1$ to $R^4$, X and m, are as defined in claim 1, $R^5$, independently of one another, are unsubstituted or substituted, saturated or unsaturated alkyl or aryl radicals and n has a value from 100 to 1600.

5. The polyorganosiloxane of claim 1, wherein said polyorganosiloxane is obtained by reacting a polyorganosiloxane, which has at least one hydroxyl group bonded to silicon, with an alkoxysilanes of formula (IV) and/or partial hydrolyzates thereof

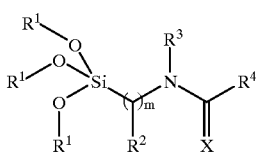

(IV)

where $R^1$ to $R^4$ and X, and also m, are as defined in claim 1.

6. The polyorganosiloxane of claim 5, wherein said polyorganosiloxane which has at least one hydroxyl group bonded to silicon corresponds to formula (V)

$$HO(SiR^5{}_2O)_nH \quad (V)$$

where $R^5$, independently of one another, are unsubstituted or substituted, saturated or unsaturated alkyl or aryl radicals and n has a value from 100 to 1600.

7. The polyorganosiloxane of claim 5, wherein said alkoxysilane used of formula (IV) or the partial hydrolysate of said alkoxysilane of formula (IV) is a compound which does not have a silyl group bonded as radical $R^1$.

8. The polyorganosiloxane claim 7, wherein said alkoxysilane of formula (IV) is selected from the group consisting of N-1-(triethoxysilyl)ethyl-N-methylacetamide, N-2-(triethoxysilyl)ethyl-N-methylacetamide, and mixtures thereof.

9. The polyorganosiloxane of claim 5, wherein said alkoxysilane of formula (IV) or partial hydrolyzates thereof is a reaction product of an alkoxysilane of formula (IV) or a partial hydrolyzate thereof which contain no silyl group, with an organosilane of formula (IV) or with a partial hydrolyzate thereof $$R^5{}_xSi(OR^1)_{4-x} \quad (VI)$$

where $R^1$ is as defined in claim 6 and $R^5$, independently of one another, is unsubstituted or substituted, saturated or unsaturated alkyl or aryl radicals and x has a value from 0 to 3.

10. The polyorganosiloxane of claim 9, wherein said organosilane of formula (VI) is selected from the group consisting of an organotriethoxysilane, a tetraethoxysilane and an admixture thereof.

11. The polyorganosiloxane of claim 5, wherein said alkoxysilane of formula (IV) is present in an amount of from 0.1 to 10% by weight, based on the amount of polyorganosiloxane which has at least one hydroxyl group bonded to silicon.

12. An RTV1 silicone rubber mixture, comprising the polyorganosiloxane with at least one dialkoxyorganosiloxy group of formula (I) as claimed in claim 1.

13. The RTV1 silicone rubber mixture of claim 12, further comprising a crosslinker.

14. The RTV1 silicone rubber mixture of claim 13, wherein said crosslinker is an alkoxysilane or a partial hydrolyzate thereof $$R^6{}_rSi(OR^1)_{4-r} \quad (VII)$$

where $R^1$, independently of each other, are unsubstituted or substituted alkyl or a silyl radical; and $R^6$ is a substituted or unsubstituted alkyl, alkenyl or aryl radical or a radical of the structure

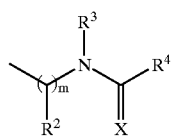

where $R^2$, independently of each other, are unsubstituted or substituted, saturated or unsaturated alkyl or aryl radicals or hydrogen, $R^3$ is unsubstituted or substituted, saturated or unsaturated alkyl, aryl or acyl radical or hydrogen, $R^4$ is unsubstituted or substituted, saturated or unsaturated alkyl or aryl radical or hydrogen and X is oxygen or sulfur, where the radicals $R^3$ and $R^4$ may form an alicyclic or heterocyclic ring, and m is either 1 or 2.

15. A polyorganosiloxane having at least one organosiloxy group of formula (I)

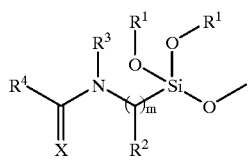
(I)

obtained by reacting a polyorganosiloxane, which has at least one hydroxyl group bonded to silicon, with a reaction product of N-1-[(methyldiethoxysiloxy)diethoxysilyl]ethyl-2-pyrrolidone and an organosilane of formula (VI) or with a partial hydrolyzate thereof $$R^5{}_xSi(OR^1)_{4-x} \qquad (VI)$$

where $R^1$, independently of each other, are unsubstituted or substituted alkyl or a silyl radical; $R^2$, independently of each other, are unsubstituted, substituted, saturated or unsaturated alkyl or aryl radicals or hydrogen; the radicals $R^3$ and $R^4$ form an ethyl-2-pyrrolidone ring; m is either 1 or 2; $R^5$ independently of one another, is unsubstituted or substituted, saturated or unsaturated alkyl or aryl radicals and x has a value from 0 to 3, and X is oxygen or sulfur.

* * * * *